(12) United States Patent
Stockbridge

(10) Patent No.: US 11,472,265 B2
(45) Date of Patent: Oct. 18, 2022

(54) REFRIGERANT LEAK DETECTION SYSTEM

(71) Applicant: Carrier Corporation, Palm Beach Gardens, FL (US)

(72) Inventor: Michael Stockbridge, Canastota, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/972,131

(22) PCT Filed: Sep. 4, 2019

(86) PCT No.: PCT/US2019/049429
§ 371 (c)(1),
(2) Date: Dec. 4, 2020

(87) PCT Pub. No.: WO2020/055633
PCT Pub. Date: Mar. 19, 2020

(65) Prior Publication Data
US 2021/0229528 A1    Jul. 29, 2021

Related U.S. Application Data

(60) Provisional application No. 62/730,183, filed on Sep. 12, 2018.

(51) Int. Cl.
*B60H 1/32* (2006.01)
(52) U.S. Cl.
CPC ................................ *B60H 1/3225* (2013.01)

(58) Field of Classification Search
CPC ............... B60H 1/3225; F25B 2500/22; F25B 2500/221; F25B 2500/222
See application file for complete search history.

(56) References Cited

U.S. PATENT DOCUMENTS 5,647,222 A * 7/1997 Sarakinis ............. B60H 1/3225
62/126
6,644,047 B2   11/2003 Taira et al.
(Continued)

FOREIGN PATENT DOCUMENTS

DE          4426339 C1    8/1995
DE      102006006963 A1   8/2007
(Continued)

OTHER PUBLICATIONS

International Search Report for International Application No. PCT/US2019/049429, International Filing Date Sep. 4, 2019, dated Nov. 19, 2019, 7 pages.
(Continued)

*Primary Examiner* — Marc E Norman
(74) *Attorney, Agent, or Firm* — Cantor Colburn LLP

(57) ABSTRACT

A leak detection system includes a sensor assembly (30) having a sensor housing (32), a leak sensor (60), and a 36 collection housing (34). The sensor housing (32) defines a first fluid inlet (40). The leak sensor (60) is disposed within the sensor housing (32). The leak sensor (60) is arranged to provide a signal indicative of a presence of the first fluid within an interior space of the transport refrigeration unit. The collection housing (34) is spaced apart from the sensor housing (32) and defines a second fluid inlet (80).

11 Claims, 5 Drawing Sheets

(56) References Cited

U.S. PATENT DOCUMENTS

| | | | |
|---|---|---|---|
| 6,742,384 B2 * | 6/2004 | Avila .................... | G01M 3/205 |
| | | | 73/49.3 |
| 7,207,180 B2 | 4/2007 | Arndt et al. | |
| 8,610,588 B2 | 12/2013 | Asprovski et al. | |
| 9,291,378 B2 | 3/2016 | Ueda et al. | |
| 10,059,169 B2 * | 8/2018 | Graaf ................... | B60H 1/3225 |
| 11,098,937 B2 * | 8/2021 | Uehara ................ | F25D 11/003 |
| 2020/0056802 A1 * | 2/2020 | Suzuki .................... | F24F 11/89 |
| 2020/0324624 A1 * | 10/2020 | Repice .............. | B60H 1/00792 |

FOREIGN PATENT DOCUMENTS

| | | |
|---|---|---|
| JP | 2004353895 A | 12/2004 |
| JP | 2013076487 A | 4/2013 |
| JP | 5633986 B1 | 12/2014 |
| JP | 2017067390 A | 4/2017 |
| JP | 2017067392 A | 4/2017 |
| WO | 2015024047 A1 | 2/2015 |
| WO | 2015072313 A1 | 5/2015 |
| WO | 2017083333 A1 | 5/2017 |
| WO | 2017083336 A1 | 5/2017 |
| WO | 2017109531 A1 | 6/2017 |
| WO | 2018147428 A1 | 8/2018 |
| WO | 2018154347 A1 | 8/2018 |

OTHER PUBLICATIONS

Written Opinion for International Application No. PCT/US2019/049429, International Filing Date Sep. 4, 2019, dated Nov. 19, 2019, 8 pages.

* cited by examiner

REFRIGERANT LEAK DETECTION SYSTEM

CROSS REFERENCE TO RELATED APPLICATIONS

This is a U.S. National Stage of Application No. PCT/US2019/049429, filed Sep. 4, 2019, which claims priority to U.S. Provisional Application No. 62/730,183, filed Sep. 12, 2018, the disclosures of which are incorporated herein by reference in their entireties.

BACKGROUND

Exemplary embodiments pertain to the art of refrigerated systems, and more specifically, to transportation refrigeration units.

Products may be shipped or stored within conditioned containers. These conditioned containers are specifically designed for conditioning an interior space with refrigerated air for an extended period of time. These refrigerated containers utilize a refrigeration unit that circulates cooled air inside the interior space through evaporator fans, which direct the air from the front of the container to the rear. Refrigerant from the refrigeration unit may leak inside the refrigerated container due to a component or system level failure.

BRIEF DESCRIPTION

Disclosed is a transport refrigeration unit. The transport refrigeration unit includes an evaporator, an evaporator fan, and a leak detection system. The evaporator is arranged to receive a first fluid flow. The evaporator fan is spaced apart from the evaporator and is arranged to move a second fluid past the evaporator. The leak detection system includes a sensor assembly having a sensor housing, a leak sensor, and a collection housing. The sensor housing defines a first fluid inlet. The leak sensor is disposed within the sensor housing. The leak sensor is arranged to provide a signal indicative of a presence of the first fluid within an interior space of the transport refrigeration unit. The collection housing is spaced apart from the sensor housing and defines a second fluid inlet.

Also disclosed is a leak detection system provided with a transportation refrigeration unit. The leak detection system includes a sensor assembly having a sensor housing, a leak sensor, and a first valve. The sensor housing defines a first fluid inlet. The leak sensor is connected to the sensor housing and is arranged to provide a signal indicative of a presence of a refrigerant. The first valve is connected to the leak sensor and disposed opposite the first fluid inlet.

Further disclosed is a method of detecting a refrigerant leak within a transport refrigeration unit. The method includes: receiving a fluid flow within at least one of a sensor housing and a collection housing that is spaced apart from the sensor housing and fluidly connected to the sensor housing; directing the fluid flow towards a leak sensor disposed within the sensor housing; and outputting for display an indicator, responsive to a concentration of a refrigerant present within the fluid flow being greater than a threshold concentration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Referring to the Figures, a refrigerated trailer, a refrigerated space, or a refrigerated container may be provided with a refrigeration system that provides conditioned air or cooled air to an interior space of the refrigerated trailer, the refrigerated space, or the refrigerated container. The refrigerant may leak into the interior space and may present a hazard should the concentration of the leaked refrigerant within the interior space exceed a threshold level.

Figure 1:
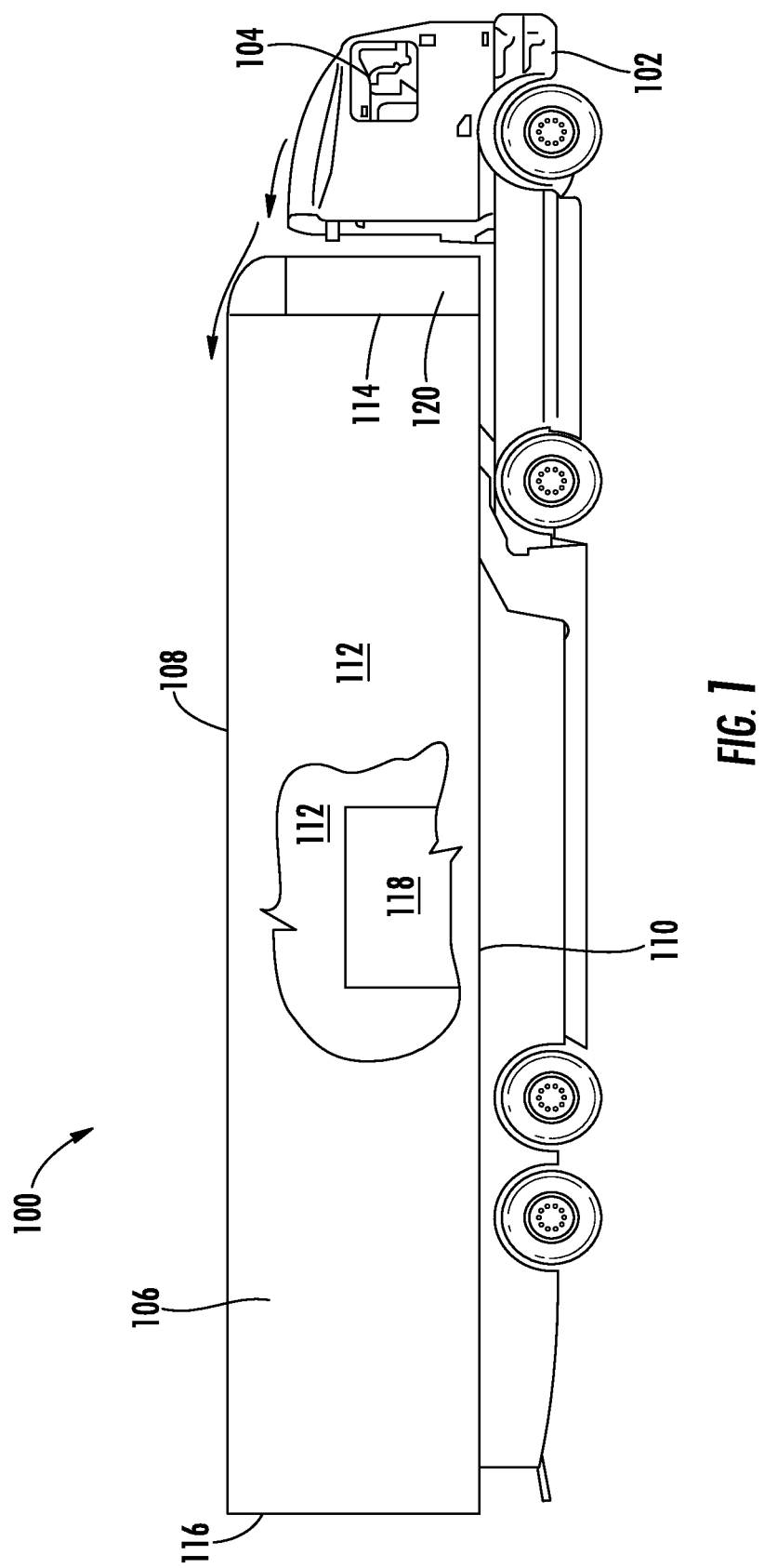
FIG. 1 depicts a tractor trailer system having a transport refrigeration unit and a cargo compartment in an example embodiment.

Shown in FIG. 1 is an embodiment of a tractor trailer system 100. The tractor trailer system 100 includes a tractor 102 including an operator's compartment or cab 104 and also including an engine, which acts as the drive system of the tractor trailer system 100. A trailer 106 is coupled to the tractor 102. The trailer 106 is a refrigerated trailer 106 and includes a top wall 108, a directly opposed bottom wall 110, opposed side walls 112, and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a transport refrigeration unit 120 located on the trailer 106. The transport refrigeration unit 120, as shown in FIG. 1, is located at or attached to the front wall 114.

Figure 2:
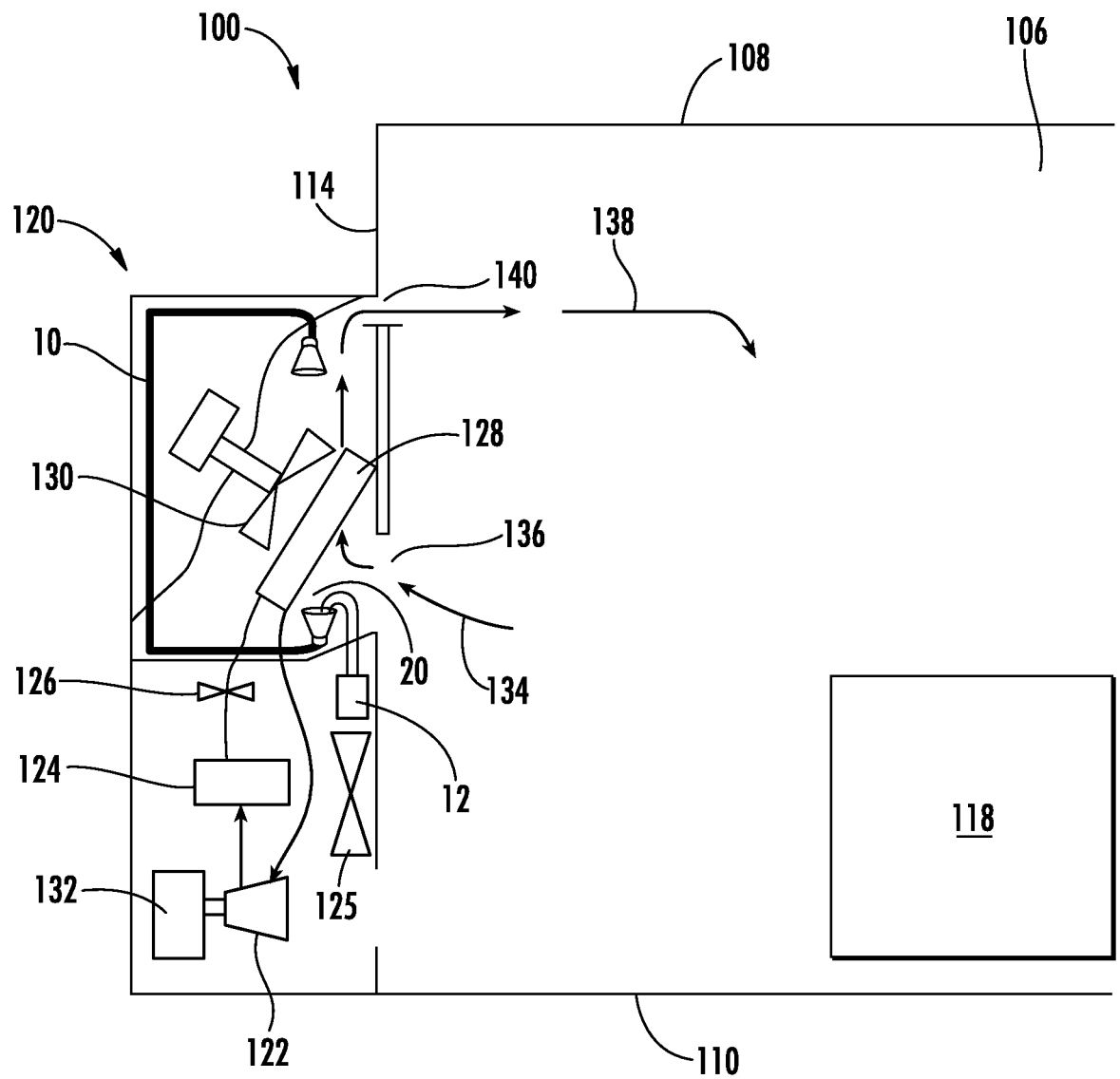
FIG. 2 depicts a transport refrigeration unit for a cargo compartment of the tractor trailer system of FIG. 1 in an example embodiment having a leak detection system.

Referring now to FIG. 2, the transport refrigeration unit 120 is shown in more detail. The transport refrigeration unit 120 includes a compressor 122, a condenser 124, a condenser fan 125, an expansion valve 126, an evaporator 128, and an evaporator fan 130, as well as other ancillary components.

Airflow is circulated into and through the cargo compartment of the trailer 106 by means of the transport refrigeration unit 120. A return airflow 134 flows into the transport refrigeration unit 120 from the cargo compartment of the trailer 106 through a refrigeration unit inlet 136, and across the evaporator 128 via the evaporator fan 130, thus cooling the return airflow 134. The cooled return airflow 134, now referred to as supply airflow 138, is supplied into the cargo compartment of the trailer 106 through a refrigeration unit outlet 140, which in some embodiments is located near the top wall 108 of the trailer 106. The supply airflow 138 cools the cargo 118 in the cargo compartment of the trailer 106.

A leak detection system 10 is also located within the transport refrigeration unit 120 and is arranged to detect the presence of refrigerant within the transport refrigeration unit 120. A controller 12 may be provided and in communication with the leak detection system 10 and/or the transportation refrigeration unit 120. The controller 12 may control various system components and may be implemented using a general-purpose microprocessor executing a computer program stored on a storage medium to perform the operations described herein.

Although FIG. 1 depicts a tractor-trailer arraignment, it is understood that embodiments described herein may be used with other cargo compartments, such as those in containers. Thus, embodiments are not limited to tractor-trailer systems.

As shown in FIG. 2, the refrigerant, e.g. the first fluid, within the evaporator 128 may leak into an interior space of the trailer 106 or leak within the transport refrigeration unit 120. The refrigerant may fall or descend below the evaporator 128 and be located proximate a collection area 20, should the evaporator fan 130 be off and not operating because the refrigerant may have a density that is greater than air. When the transport refrigeration unit 120 is on and the evaporator fan 130 is operating, the evaporator fan 130 may duct or flow the refrigerant away from the collection area 20 and towards the refrigeration unit outlet 140, potentially enabling the refrigerant to escape into the trailer 106.

The leak detection system 10 is arranged to detect the presence of refrigerant within the transport refrigeration unit 120 before it escapes into the trailer 106, regardless of whether the evaporator fan 130 is on or off. Therefore, the leak detection system 10 is arranged to detect the presence of refrigerant either within the collection area 20 or in other areas, such as above the evaporator 128. The dual sensing locations facilitate a faster leak detection response time without having the refrigerant circulated throughout the trailer 106.

Figure 3:
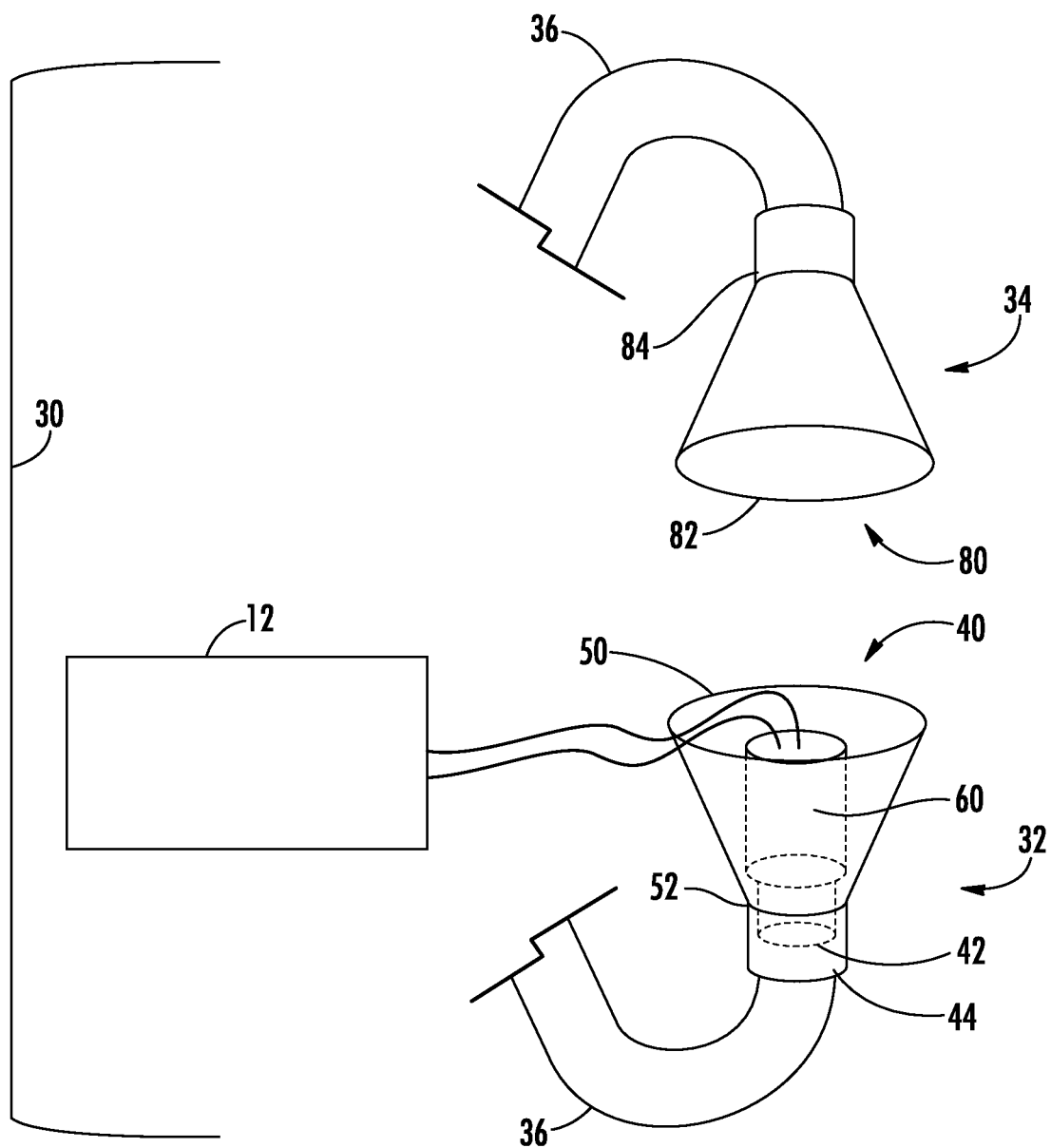
FIG. 3 is a schematic illustration of a sensor assembly provided with the fluid delivery unit.

As shown in FIG. 3 the leak detection system 10 includes a sensor assembly 30 that is at least partially disposed within the transport refrigeration unit 120. The sensor assembly 30 includes a sensor housing 32, a collection housing 34, a conduit 36 that extends between the collection housing 34 and the sensor housing 32 to fluidly connect the sensor housing 32 to the collection housing 34, and the controller 12. The sensor housing 32 and the collection housing 34 are disposed on opposite sides of the evaporator 128 such that the evaporator 128 is disposed between the sensor housing 32 and the collection housing 34.

Referring to FIGS. 2 and 3, the sensor housing 32 is disposed within the collection area 20. The sensor housing 32 includes a first fluid inlet 40, a receiving portion 42, and a first valve 44. The first fluid inlet 40, the receiving portion 42, and the first valve 44 may be integrated into the sensor housing 32 or all define the sensor housing 32.

The first fluid inlet 40 extends between a first end 50 and the second end 52. The first end 50 may have a first cross-sectional form and the second end 52 may have a second cross-sectional form. The first cross-sectional form may be greater than the second cross-sectional form such that the first fluid inlet 40 has a funnel or frustoconical shape that directs a fluid flow from the first end 50 towards the second end 52 such that the fluid flow is directed towards the receiving portion 42.

The receiving portion 42 extends from the second end 52 of the first fluid inlet 40. The receiving portion 42 is arranged to receive a leak sensor 60. The receiving portion 42 may be integrally formed with the leak sensor 60 such that the receiving portion 42 is a sensor housing of the leak sensor 60. The leak sensor 60 is arranged to provide a signal indicative of a concentration or the presence of refrigerant within the transport refrigeration unit 120 or that is received within the sensor housing 32 to the controller 12. The receiving portion 42 and the leak sensor 60 extends between the second end 52 of the first fluid inlet 40 and the first valve 44.

The first valve 44 is disposed opposite the first fluid inlet 40 or spaced apart from the first fluid inlet 40 by the receiving portion 42. The first valve 44 is movable between a closed position and an open position to selectively facilitate a fluid flow from the collection housing 34 towards the leak sensor 60. The first valve 44 inhibits a fluid flow from the collection housing 34, through the conduit 36, towards the leak sensor 60 while in the closed position. The first valve 44 facilitates a fluid flow from the collection housing 34, through the conduit 36, to the leak sensor 60 while in the open position.

Figure 4:
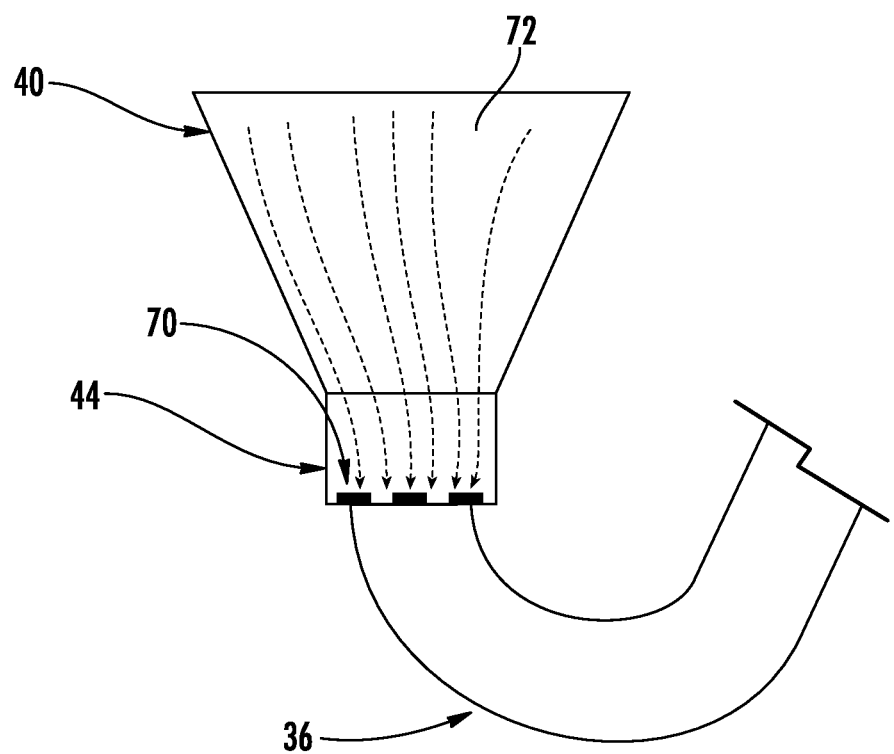
FIG. 4 is an illustration of a valve of the sensor assembly in a closed position.
Figure 5:
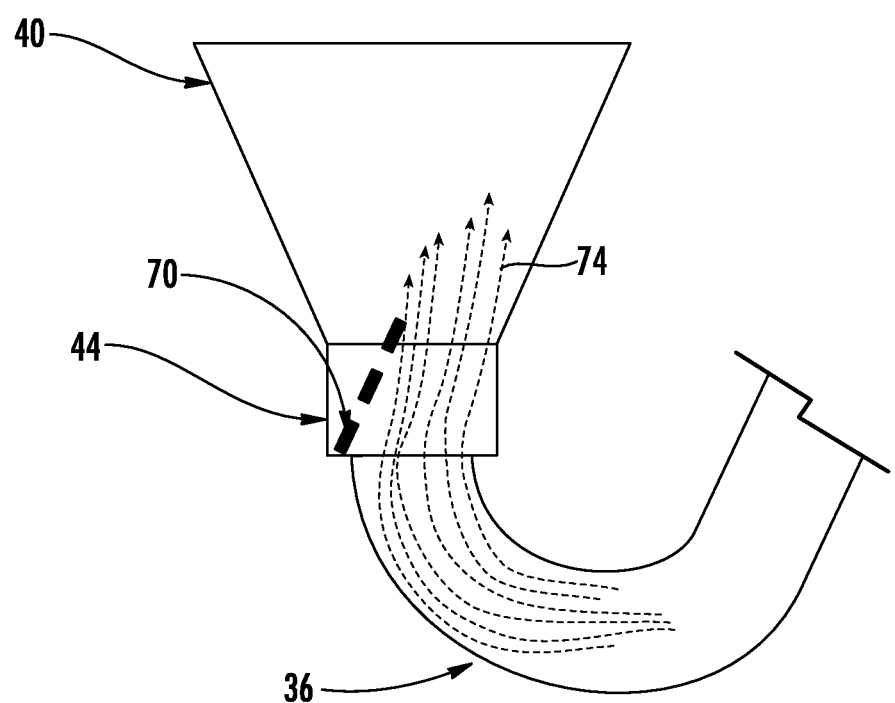
FIG. 5 is an illustration of the valve of the sensor assembly in an open position.

Referring to FIGS. 3-5, the first valve 44 includes a valve member 70 that moves between the closed position and the open position such that the first valve 44 selectively facilitates the fluid flow between the collection housing 34 and the sensor housing 32. The valve member 70 is in a closed position while there is no fluid flow or fluid flow less than a threshold between the collection housing 34 and the sensor housing 32 via the conduit 36, as shown in FIG. 4. In at least one embodiment, a fluid flow 72 in a first direction that is received through the first fluid inlet 40 of the sensor housing 32 may inhibit the valve member 70 from moving away from the closed position. The fluid flow 72 in the first direction may be the descending of the refrigerant into the first fluid inlet 40. The valve member 70 moves towards the open position while there is fluid flow greater than a threshold between the collection housing 34 and the sensor housing 32 via the conduit 36, as shown in FIG. 5. In at least one embodiment, a fluid flow 74 in a second direction that is disposed opposite the first direction, that is received through the second fluid inlet 80 of collection housing 34 and directed through the conduit 36 towards the first valve 44, moves the valve member 70 away from the closed position. The fluid flow 74 in the second direction may be flow that flows through the collection housing 34 through the conduit 36 due to the operation of the evaporator fan 130.

Referring to FIGS. 2 and 3, the collection housing 34 is spaced apart from the sensor housing 32. The collection housing 34 is disposed above the evaporator 128. The collection housing 34 includes a second fluid inlet 80. The second fluid inlet 80 extends between a first end 82 and the second end 84. The first end 82 may have a first cross-sectional form and the second end 84 may have a second cross-sectional form. The first cross-sectional form may be greater than the second cross-sectional form such that the second fluid inlet 80 has a general funnel or frustoconical shape that directs a fluid flow (e.g. the second fluid flow) from the first end 82 towards the second end 84 such that the fluid flow is directed towards the conduit 36 and towards the leak sensor 60.

The conduit 36 extends between and is fluidly connected to the sensor housing 32 and the collection housing 34. The conduit 36 extends between the second end 84 of the second fluid inlet 80 of the collection housing 34 and the first valve 44.

In at least one embodiment, the first valve 44 may be connected to the second end 84 of the second fluid inlet 80 such that the conduit 36 extends between the first valve 44 and the leak sensor 60.

The controller 12 may be a controller that is provided with the refrigeration system or may be a controller dedicated to the leak detection system 10. The controller 12 is provided with input communication channels that are arranged to receive information, data, or signals from the leak sensor 60.

The controller 12 is provided with output communication channels that are arranged to provide commands, signals, or data to a display or a monitoring system. The controller 12 is provided with at least one processor that is programmed to output for display an indicator based on information, data, or signals provided via the input communication channels and output commands via the output communication channels.

Responsive to operation of the evaporator fan 130 moving the second fluid past the evaporator 128, a fluid flow enters the second fluid inlet 80 of the collection housing 34 and flows through the conduit 36 towards the sensor housing 32. The fluid flow may move the valve member 70 of the first valve 44 from the closed position towards the open position, enabling the leak sensor 60 to detect or monitor for the presence of the first fluid within the second fluid as shown in FIG. 5. Responsive to the descending of the refrigerant or first fluid from the evaporator 128, a fluid flow enters the first fluid inlet 40 of the sensor housing 32 and flows towards the leak sensor 60, enabling the leak sensor 60 to detect or monitor for the presence of the first fluid within the fluid flow from within the collection area 20.

The controller 12 is arranged to receive the signal from the leak sensor 60. Responsive to the signal being indicative of a concentration of the refrigerant (e.g. first fluid) within the fluid flow or within the second fluid being greater than a threshold concentration, the controller 12 is programmed to output for display an indicator. The indicator may be an auditory indicator, visual indicator, or the like that provides a notification as to the presence of a refrigerant leak. The indicator enables corrective action to be taken to mitigate the leak. In at least one embodiment, the controller 12 may be replaced with an indicator such as an indicator light that is arranged to receive a signal directly from the leak sensor 60. Responsive to the signal being indicative of a concentration of the refrigerant (e.g. first fluid) within the fluid flow or within the second fluid being greater than a threshold concentration, the indicator light is arranged to illuminate or output for display a luminous indicator.

The leak detection system 10 enables two-sided detection within the transport refrigeration unit 120 to enable faster leak detection times. The leak detection system 10 facilitates the detection of refrigerant within the transport refrigeration unit 120 regardless of if the fluid delivery unit is on and operational or off.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration unit, comprising:
    an evaporator arranged to receive a first fluid flow;
    an evaporator fan spaced apart from the evaporator, the evaporator fan being arranged to move a second fluid past the evaporator; and
    a leak detection system, comprising:
        a sensor assembly having:
            a sensor housing defining a first fluid inlet,
            a leak sensor disposed within the sensor housing, the leak sensor arranged to provide a signal indicative of a presence of the first fluid within an interior space of the transport refrigeration unit, and
            a collection housing, spaced apart from the sensor housing, the collection housing defining a second fluid inlet;
        wherein the sensor assembly further includes a conduit extending between and fluidly connected to the sensor housing and the collection housing.

2. The transport refrigeration unit of claim 1, wherein the sensor assembly further comprising:
    a controller arranged to receive the signal, the controller being programmed to output for display an indicator, responsive to the signal being indicative of a concentration of the first fluid within at least one of the interior space and within the second fluid being greater than a threshold.

3. The transport refrigeration unit of claim 1, wherein the sensor assembly further comprising:
    a first valve disposed opposite the first fluid inlet, the first valve arranged to selectively facilitate a fluid flow between the collection housing and the leak sensor.

4. The transport refrigeration unit of claim 3, wherein responsive to operation of the evaporator fan moving the second fluid past the evaporator, a fluid flow enters the collection housing and flows through the conduit towards the sensor housing.

5. The transport refrigeration unit of claim 4, wherein the fluid flow moves the first valve from a closed position towards an open position.

6. A transport refrigeration unit, comprising:
    an evaporator arranged to receive a first fluid flow;
    an evaporator fan spaced apart from the evaporator, the evaporator fan being arranged to move a second fluid past the evaporator; and
    a leak detection system, comprising:
        a sensor assembly having:
            a sensor housing defining a first fluid inlet,
            a leak sensor disposed within the sensor housing, the leak sensor arranged to provide a signal indicative of a presence of the first fluid within an interior space of the transport refrigeration unit, and
        a collection housing, spaced apart from the sensor housing, the collection housing defining a second fluid inlet;
        wherein the evaporator is disposed between the collection housing and the sensor housing.

7. A leak detection system configured for use with a transportation refrigeration unit, comprising:
    a sensor assembly, comprising:

a sensor housing defining a first fluid inlet,
a leak sensor connected to the sensor housing, the leak sensor arranged to provide a signal indicative of a presence of a refrigerant, and
a first valve connected to the leak sensor and disposed opposite the first fluid inlet;
wherein the sensor assembly further includes:
a collection housing, spaced apart from the sensor housing, the collection housing defining a second fluid inlet;
a conduit extending between and fluidly connected to the first valve and the collection housing.

8. The leak detection system of claim 7, wherein responsive to a fluid flow that enters the second fluid inlet of the collection housing and flows through the conduit towards the sensor housing, the first valve moves from a closed position towards an open position to facilitate the fluid flow to flow towards the leak sensor.

9. The leak detection system of claim 8, wherein the sensor assembly further comprising:
an indicator arranged to receive the signal, the indicator arranged to output for display an indicator, responsive to the signal being indicative of a concentration of the refrigerant within the fluid flow being greater than a threshold.

10. A method of detecting a refrigerant leak within a transport refrigeration unit, comprising:
receiving a fluid flow within at least one of a sensor housing and a collection housing that is spaced apart from the sensor housing and fluidly connected to the sensor housing;
directing the fluid flow towards a leak sensor disposed within the sensor housing;
outputting for display an indicator, responsive to a concentration of a refrigerant present within the fluid flow being greater than a threshold concentration;
wherein the sensor housing is provided with a first valve having a valve member movable between an open position and a closed position;
wherein responsive to the fluid flow being received through a first fluid inlet of the sensor housing, the valve member is inhibited from moving away from the closed position.

11. A method of detecting a refrigerant leak within a transport refrigeration unit, comprising:
receiving a fluid flow within at least one of a sensor housing and a collection housing that is spaced apart from the sensor housing and fluidly connected to the sensor housing;
directing the fluid flow towards a leak sensor disposed within the sensor housing;
outputting for display an indicator, responsive to a concentration of a refrigerant present within the fluid flow being greater than a threshold concentration;
wherein the sensor housing is provided with a first valve having a valve member movable between an open position and a closed position;
wherein responsive to the fluid flow being received through a second fluid inlet of the collection housing and directed towards the first valve moves the valve member away from the closed position.

* * * * *